US005548748A

United States Patent [19]
Fuse

[11] Patent Number: 5,548,748
[45] Date of Patent: Aug. 20, 1996

[54] ONE-CHIP SEMICONDUCTOR INTEGRATED CIRCUIT DEVICE HAVING A DIGITAL SIGNAL PROCESSING CIRCUIT AND AN ANALOG SIGNAL PROCESSING CIRCUIT

[75] Inventor: Takeshi Fuse, Yokohama, Japan

[73] Assignee: Fujitsu Limited, Kawasaki, Japan

[21] Appl. No.: 567,495

[22] Filed: Aug. 14, 1990

[30] Foreign Application Priority Data

Aug. 18, 1989  [JP]  Japan .................................... 1-213459

[51] Int. Cl.⁶ ...................................................... G06F 1/04
[52] U.S. Cl. .................... 395/550; 364/248.6; 364/232.8; 364/270.7; 364/DIG. 1
[58] Field of Search ...................................... 395/550, 750

[56] References Cited

U.S. PATENT DOCUMENTS 3,921,079  11/1975  Heffner et al. .
4,379,265   4/1983  Catiller .................................... 328/55
4,746,899   5/1988  Swanson et al. ................. 340/347 AD
5,140,688   8/1992  White et al. .............................. 395/550

OTHER PUBLICATIONS

"Two–Phase Adjustable Clock Circuit", Willson, IBM Technical Disclosure Bulletin, vol. 20, No. 5, Oct., 1977, pp. 1905–1906.
"Microcomputers", Titus, E.D.N. Eletrical Design News, vol. 31, No. 1, Jan., 1986, pp. 91–106.

Primary Examiner—Kevin J. Teska
Assistant Examiner—Agni Mohemed
Attorney, Agent, or Firm—Nikaido, Marmelstein, Murray & Oram LLP

[57] ABSTRACT

A one-chip semiconductor integrated circuit device includes a digital signal processing circuit which processes a digital signal in synchronism with a first clock signal, and an analog signal processing circuit which samples an analog input signal in synchronism with a second clock signal having a phase different from that of said first clock signal.

30 Claims, 7 Drawing Sheets 5,548,748

ONE-CHIP SEMICONDUCTOR INTEGRATED CIRCUIT DEVICE HAVING A DIGITAL SIGNAL PROCESSING CIRCUIT AND AN ANALOG SIGNAL PROCESSING CIRCUIT

BACKGROUND OF THE INVENTION

The present invention generally relates to a semiconductor integrated circuit device having a digital signal processing circuit and an analog signal processing circuit which are provided on a single chip.

A one-chip microcomputer is widely used. Generally, a one-chip microcomputer includes a central processing unit, a random access memory, a read only memory, a timing generator and an input/output port. A more advanced one-chip microcomputer further includes an analog signal processing circuit, such as an analog-to-digital converter (hereinafter simply referred to as an A/D converter) in order to provide an improved processing ability. The A/D converter built in the one-chip microcomputer receives an analog input signal from an external device and converts the same into a digital signal. Currently, a high-precision A/D converter is required. Conventionally, a digital signal processing circuit, such as a CPU, and an analog signal processing circuit, such as an A/D converter, are driven by a system clock or respective clocks which are generated from the system clock.

It will be noted that the arrangement of interconnection (wiring) lines on the chip becomes more complex with an increase in the integration density. Thus, there is a possibility of clock signal lines and power supply lines being close to each other. In this case, the clock signal lines and the power supply lines are electrostatically coupled to each other so that coupling capacitance will be formed therebetween. The power supply lines are affected by a level change of the system clock signal from a high level to a low level and vice versa so that noise components are superimposed on power supply voltages. Such noise components superimposed on power supply voltages appear in synchronism with the system clock signal. Generally, at least either a positive power supply voltage or a negative power supply voltage applied to the A/D converter is used in common with the digital signal processing circuit. Thus, the noise components are applied to the A/D converter and, as a result, the precision of the A/D conversion deteriorates. In some cases, the A/D converter malfunctions due to the noise components.

The noise components also arise due to the following reasons. A voltage drop across a parasitic resistance on the a power supply line is generated when the system clock signal changes its state. An unwanted radiation of a high-frequency noise component takes place when the system clock signal changes.

The above-mentioned problems are illustrated in FIG. 1. When a system clock CK1 rises at time $t_0$, a noise component appears on a power supply voltage. Similarly, when the system clock CK1 falls, a noise component appears on the power supply voltage. In this way, noise components on the power supply voltage appear in synchronism with the rises and falls of the system clock signal CK1. An analog signal processing circuit, such as an A/D converter operates in synchronism with the system clock signal. Thus, when the system clock signal changes, the analog signal processing circuit is affected by the occurrence of noise components and, as a result, the precision of the A/D conversion deteriorates and a malfunction thereof is caused.

SUMMARY OF THE INVENTION

It is a general object of the present invention to provide an improved semiconductor integrated circuit device having a digital signal processing circuit and an analog signal processing circuit in which the above-mentioned disadvantages are eliminated.

A more specific object of the present invention is to provide a semiconductor integrated circuit device having an arrangement which prevents the analog signal processing circuit from being affected by noise components superimposed on the power supply voltages.

The above-mentioned objects of the present invention are achieved by a one-chip semiconductor integrated circuit device comprising: digital signal processing means for processing a digital signal in synchronism with a first clock signal; and analog signal processing means for sampling an analog input signal in sychronism with a second clock signal having a phase different from that of the first clock signal.

The aforementioned objects of the present invention are also achieved by a one-chip semiconductor integrated circuit device comprising: digital signal processing means for processing a digital signal in synchronism with a first clock signal; timing generating means for generating a second clock signal from the first clock signal, the second clock signal having a cycle different from that of the first clock signal and rising and falling when the first clock signal rises and falls; delay means, coupled to the timing generating means, for delaying the second clock signal by a predetermined delay time and for outputting a third clock signal which rises and falls at timings different from timings at which the first clock signal rises and falls; and analog signal processing means, directly coupled to the delay means, for sampling an analog input signal in synchronism with the third clock signal.

The aforementioned objects of the present invention are also achieved by a one-chip semiconductor integrated circuit device comprising: digital signal processing means for processing a digital signal in synchronism with a first clock signal; timing generating means for generating a second clock signal and a third clock signal from the first clock signal, each of the second and third clock signals having a cycle different from that of the first clock signal and rising and falling when the first clock signal rises and falls; delay means, coupled to the timing generating means, for delaying the second and third clock signals by respective predetermined delay times and for outputting fourth and fifth clock signals which rise and fall at timings different from timings at which the first clock signal rises and falls; and analog signal processing means, directly coupled to the delay means, for sampling an analog input signal in synchronism with the fourth and fifth clock signals.

BRIEF DESCRIPTION OF THE DRAWINGS

Other objects, features and advantages of the present invention will become more apparent from the following detailed description when read in conjunction with the accompanying drawings, in which:

FIGS. 5(a)–5(h') are waveform diagrams illustrating the operation of the circuit shown in FIG. 4;

DESCRIPTION OF THE PREFERRED EMBODIMENTS

Figure 1:
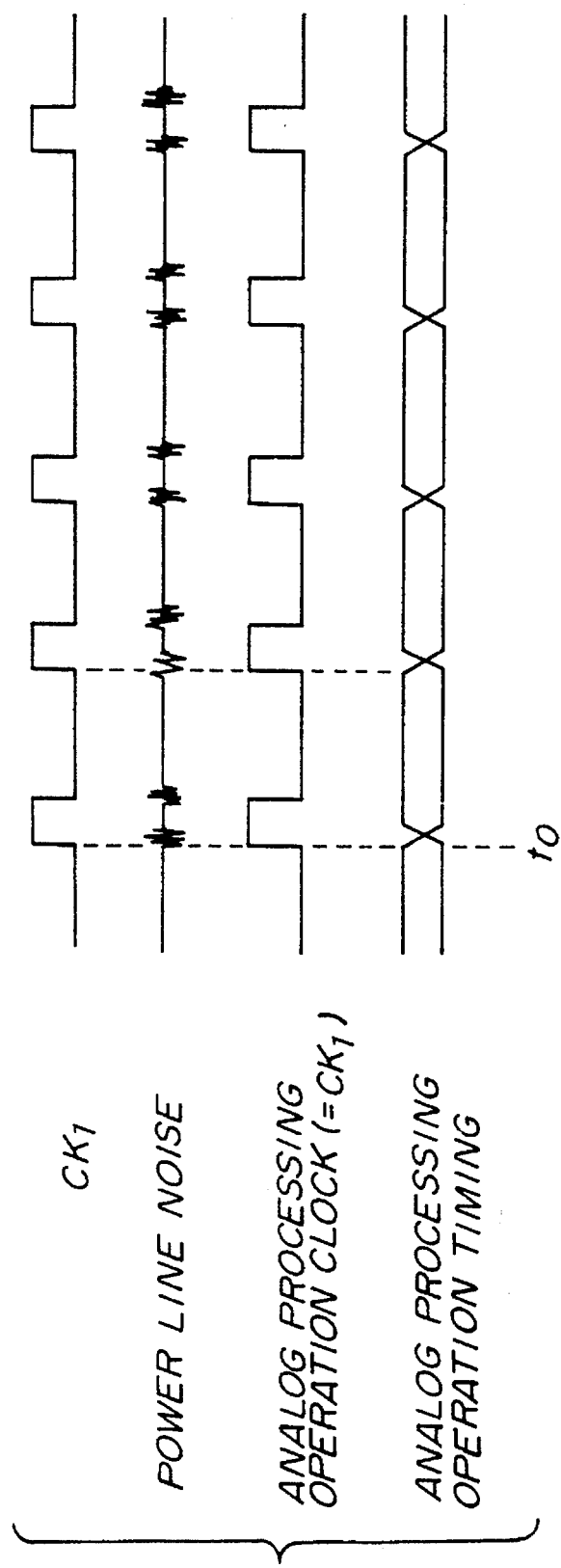
FIG. 1 is a waveform diagram of signals illustrating problems of a conventional semiconductor integrated circuit device having a digital signal processing circuit and an analog signal processing circuit.
Figure 2:
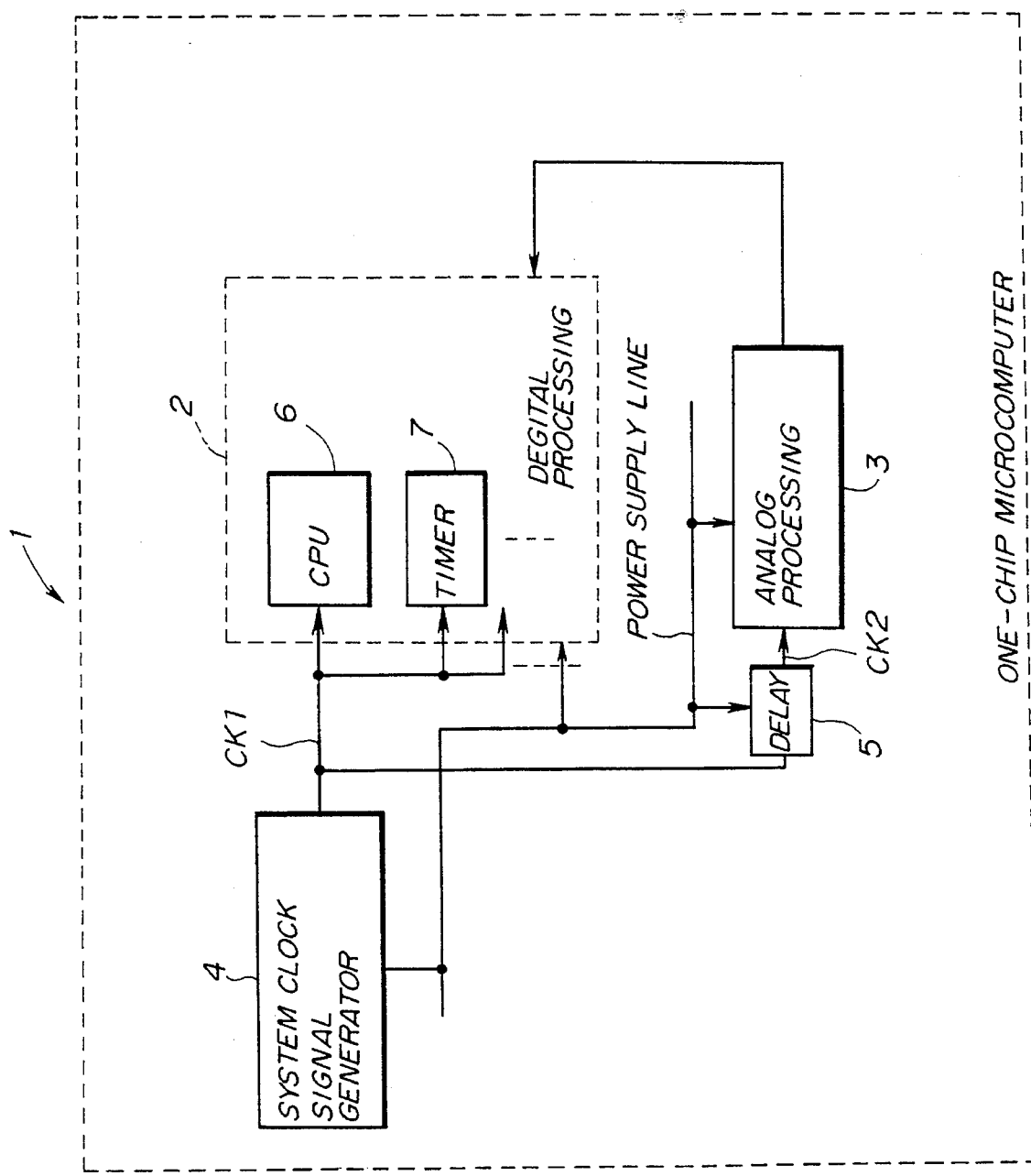
FIG. 2 is a block diagram of a semiconductor integrated circuit device (one-chip microcomputer) according to a preferred embodiment of the present invention.

Referring to FIG. 2, there is illustrated a one-chip microcomputer according to a preferred embodiment of the present invention. A one-chip microcomputer 1 is composed of a digital signal processing circuit 2, an analog signal processing circuit 3, a system clock generator 4 and a delay circuit 5. The digital signal processing circuit 2 comprises a central processing unit (CPU) 6, a timer 7, and other elements, as will be described in more detail later. The system clock generator 4 generates a system clock signal CK1, which is input to the digital signal processing circuit 2 and the delay circuit 5. Each structural element of the digital signal processing circuit 2 operates in synchronism with the system clock signal CK1. The delay circuit 5 delays the system clock signal CK1 by a predetermined delay time and generates a delayed system clock signal CK2. The delayed system clock signal CK2 is input to the analog signal processing circuit 3, which operates in synchronism with the delayed system clock signal CK2. A digital output signal from the analog signal processing circuit 3 is supplied to, for example, the digital signal processing circuit 2.

The delayed system clock signal CK2 lags behind the system clock signal CK1 so that the delayed system clock signal CK2 rises (or falls) after the level of a noise component superimposed on a power supply voltage becomes approximately zero. In other words, there is a phase difference between the system clock signal CK1 and the delayed system clock signal CK2 which is equal to or greater than the duration of time during which the noise component exists. As a result, even if the system clock signal CK1 is affected by the noise component superimposed on the positive and/or negative power supply voltage, the delayed system clock signal CK2 is not affected. It is preferable that a clock signal line which carries the delayed system clock signal CK2 be spaced apart from the power supply lines so that the clock signal line is not affected by noise components on the power supply lines.

Figure 3:
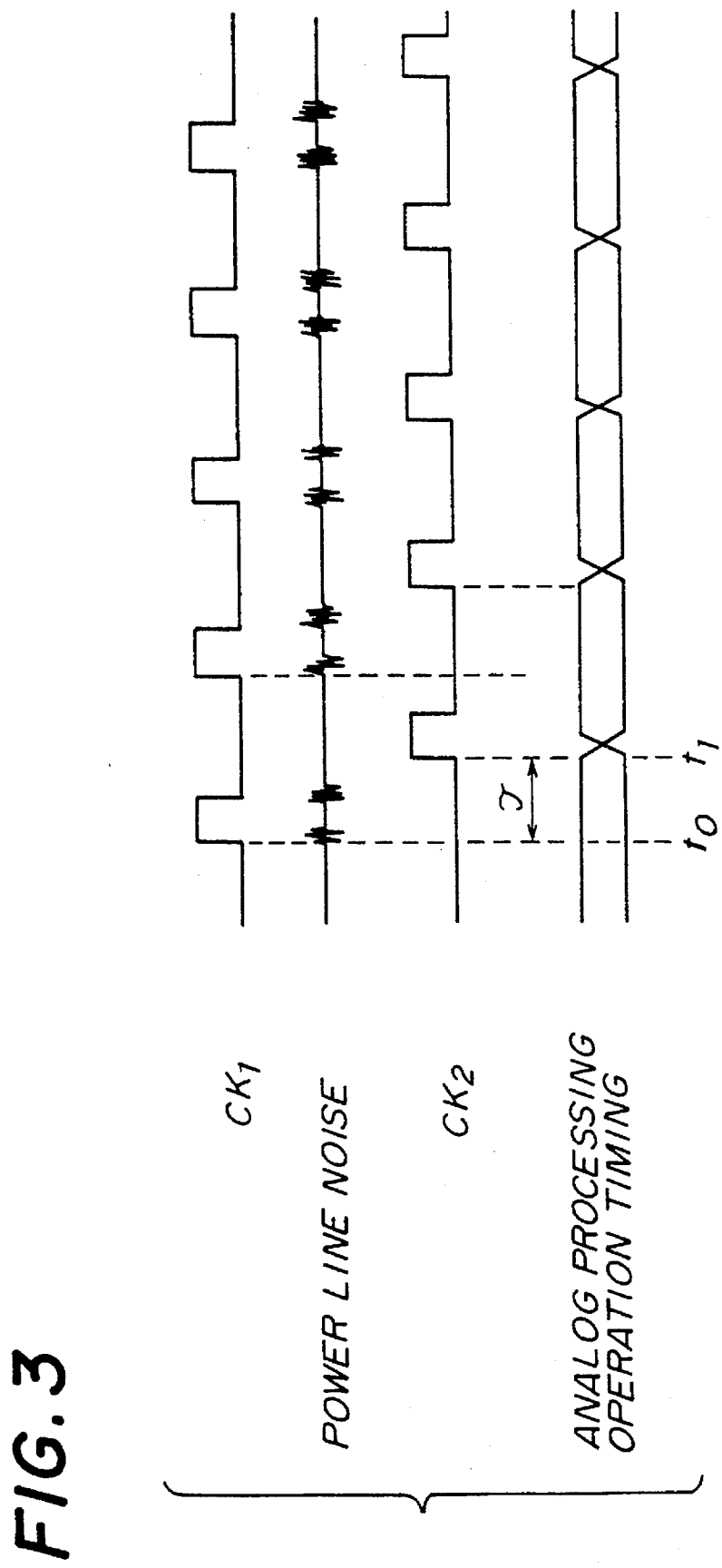
FIG. 3 is a waveform diagram illustrating the operation of the one-chip microcomputer shown in FIG. 2.

FIG. 3 is a waveform diagram illustrating the operation of the configuration shown in FIG. 2. The delayed system clock signal CK2 lags behind the system clock signal CK1 by a time $\tau$. In other words, there is a phase difference equal to the time $\tau$ between the system clock signal CK1 and the delayed system clock signal CK2. At time $t_1$ when the time $\tau$ elapses from the rise of the system clock signal CK1 at time $t_0$, noise components resulting from the rises and falls of the system clock signal CK1 have become zero. The operation timing of the analog signal processing circuit 3 defined by the delayed system clock signal CK2 is different from that of the digital signal processing circuit 2 defined by the system clock signal CK1. Thus, the analog signal processing circuit 3 is not affected by the noise components.

Figure 4:
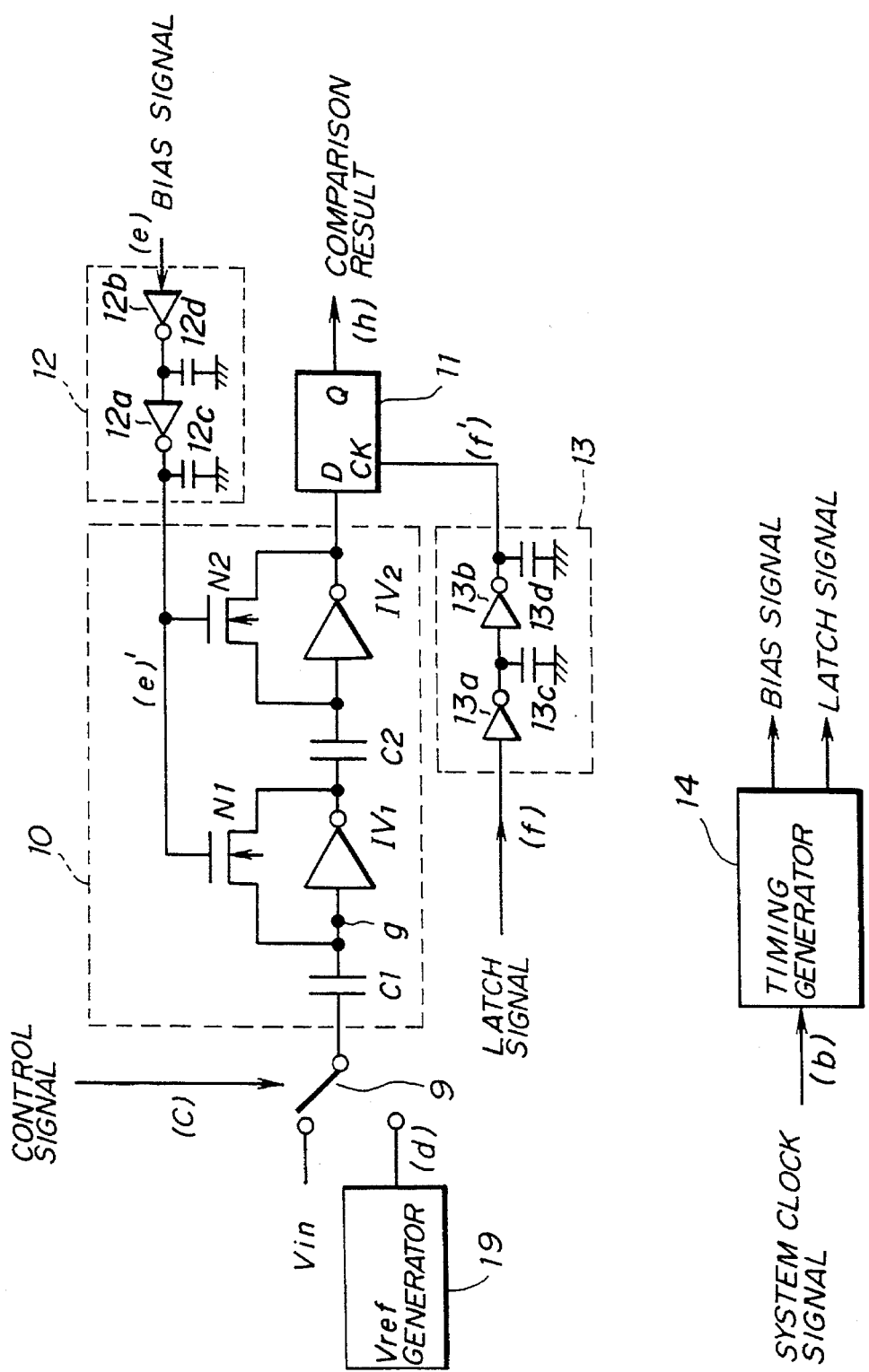
FIG. 4 is a circuit diagram of a digital-to-analog converter contained in an analog signal processing circuit shown in FIG. 2.

Referring to FIG. 4, there is illustrated a sample and hold circuit of an A/D converter which corresponds to the analog signal processing circuit shown in FIG. 2. The A/D converter having the sample 1 and hold circuit arranged at the input stage thereof, as shown in FIG. 4, is a sequential comparison A/D converter, which is called a chopper type A/D converter. The sample and hold circuit of the A/D converter shown in FIG. 4 is comprised of a switch 9, a comparator 10, a latch circuit 11, a first delay circuit 12 and a second delay circuit 13. The first and second delay circuits 12 and 13 are employed according to the present invention.

The switch 9 selects either an input voltage Vin or a reference voltage Vref generated by a reference voltage generator 19 by a control signal supplied from the digital signal processing circuit 2 (FIG. 2), and outputs the selected voltage to an input terminal of the comparator 10. The comparator 10 compares the input voltage Vin with the reference voltage Vref. The first delay circuit 12 delays a bias signal so that the operation timing of the comparator 10 is different from that of the digital signal processing circuit 2 (FIG. 2). The bias signal is derived from the system clock signal CK1 by a timing generator 14 formed on the same chip. The first delay circuit 12 is made up of two inverters 12a and 12b connected in series and two capacitors 12c and 12d. The capacitors 12c and 12d are connected between the output terminals of the inverters 12a and 12b and ground, respectively.

The second delay circuit 13 delays a latch signal so that the timing of the latch circuit 11 at which an output signal of the comparator 10 is latched is different from that of the digital signal processing circuit 2. The second delay circuit 13 is made up of two inverters 13a and 13b connected in series and two capacitors 13c and 13d. The capacitors 13c and 13d are connected between the output terminals of the inverters 13a and 13b and ground, respectively.

The comparator 10 is composed of two N-channel MOS (metal oxide semiconductor) transistors N1 and N2, two coupling capacitors C1 an C2, and two inverters IV1 and IV2. One of the two ends of the capacitor C1 is connected to the switch 9, and the other end thereof is connected to the input terminal of the inverter IV1. The MOS transistor N1 is connected between the input and output terminals of the inverter IV1. The capacitor C2 is connected between the output terminal of the inverter IV1 and the input terminal of the inverter IV2. The MOS transistor N2 is connected between the input and output terminals of the inverter IV2. The output terminal of the inverter IV2 is connected to a data input terminal D of the latch circuit 11. A delayed bias signal derived from the first delay circuit 12 is applied to the gates of the MOS transistors N1 and N2. A delayed latch signal generated and output by the second delay circuit 13 is input to a clock terminal of the latch circuit 11. The output signal from the latch circuit 11 is sent to a next stage where the output signal is digitized.

When the input voltage Vin is sampled, the bias signal is turned ON. The bias signal is delayed by the first delay circuit 12 and is then applied to the gates of the MOS transistors N1 and N2. Thereby, the MOS transistors N1 and N2 are turned ON. At this time, an input voltage Vinv which is applied to the inverter IV1 has become almost equal to a logical threshold voltage $V_{TH}$ of the inverter IV1. Thus, the following formula is obtained:

$$\text{Vinv} = V_{TH}$$

A charge Qg obtained at node (g) of the circuit shown in FIG. 4 is as follows.

$$Qg = C(Vin - V_{TH})$$

where C is the capacitance of the capacitor C1. During a comparison operation, the switch 9 selects the reference voltage Vref and the bias signal is maintained in the inactive state. Thus, during a comparison operation, the two MOS transistors N1 and N2 are OFF. In this state, a charge Qg' obtained at the node (g) which is calculated on the basis of the law of charge conservation is as follows.

$$Qg' = C(Vref - Vx) = C(Vin - V_{TH})$$

Thus, the following relationship is obtained.

$$Vref - Vx = Vin - V_{TH}$$

$$\therefore Vx = (Vref - Vin) + V_{TH}$$

It can be seen from the above formulas that the difference between the input voltage Vin and the reference voltage Vref appears at the node (a) when the input voltage Vin is compared with the reference voltage Vref. This difference is latched by the latch circuit 11 in synchronism with the delayed latch signal generated and output by the second delay circuit 13.

The chopper comparator is very sensitive to noise. In other words, this type of A/D converter has a low power supply rejection ratio (PSRR). Thus, if the sequential comparison type A/D converter operates in a situation where the bias signal to the comparison circuit 10 and the latch signal to the latch circuit 11 are synchronized with the digital processing circuit, the A/D conversion characteristics deteriorate and the A/D converter may malfunction. This is because the bias signal and the latch signals are generated from the system clock which is affected by noise components superimposed on the power supply voltages. As has been described previously, the noise components also arise from other causes. On the other hand, by employing the first and second delay circuits 12 and 13, the delayed bias signal and the delayed latch signal rise or fall at timings which are different from the timing at which the input voltage Vin is sampled and compared with the reference voltage Vref. Thus, the aforementioned problems can be eliminated.

Figure 5:
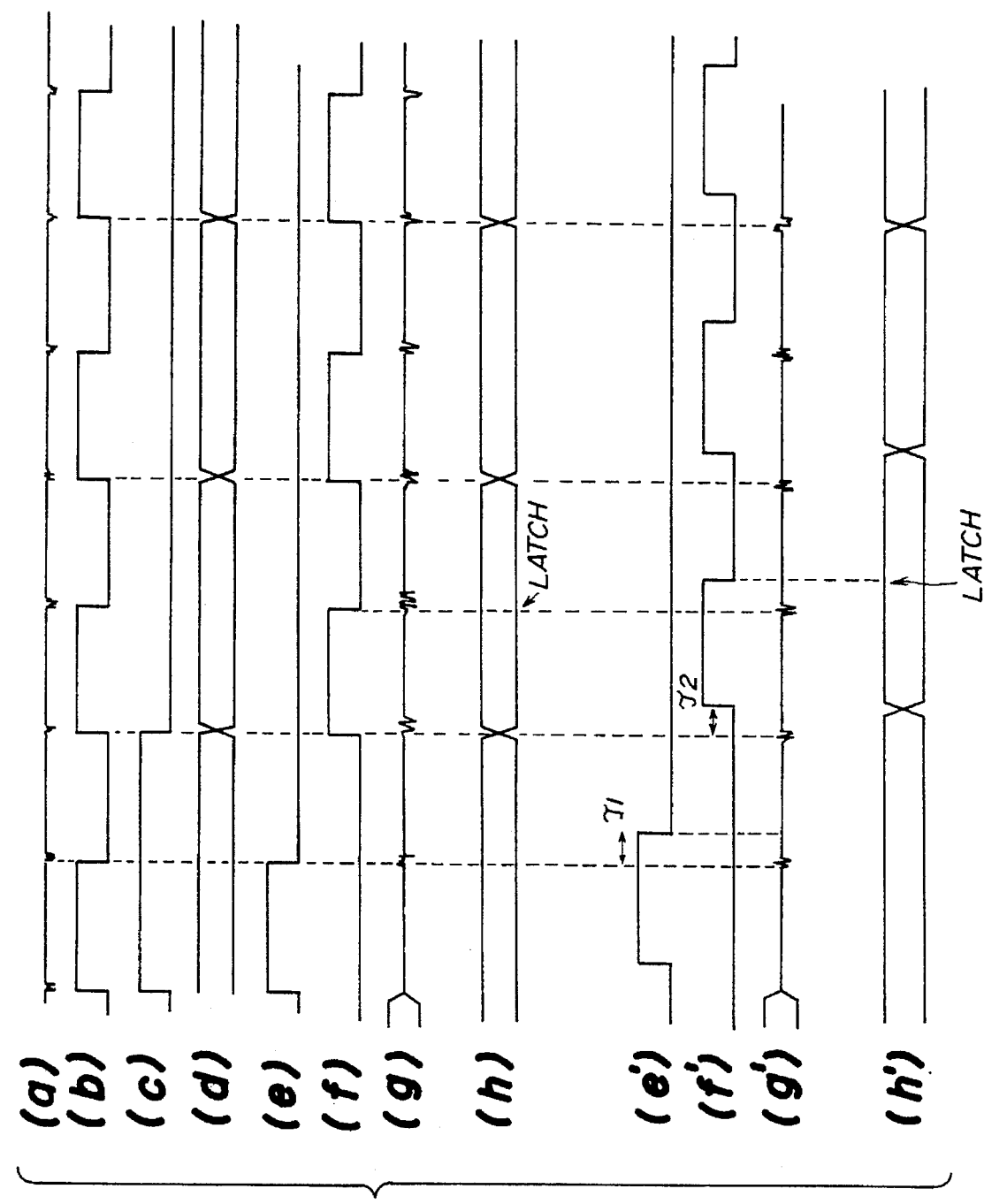

FIG. 5 is a waveform diagram illustrating the operation of the sample and hold circuit shown in FIG. 4. Waveforms (b) through (h) and (e') through (h') shown in FIG. 5 are observed at parts (b) through (h) and (e') through (h') shown in FIG. 4. FIG. 5-(a) shows a waveform of a power supply voltage. FIG. 5-(h) illustrates the waveform which will be obtained if the bias signal having the waveform shown in FIG. 5-(e) and the latch signal having the waveform shown in FIG. 5-(f) are directly applied to the comparator 10 and the latch circuit 11, respectively. In the case shown in FIG. 5, the comparator 10 samples the input signal when the bias signal shown in FIG. 5-(e) falls, and the latch circuit 11 latches the output signal from the comparator 10 when the latch signal shown in FIG. 5-(f) falls. Since the bias signal and the latch signal are generated in synchronism with the system clock signal CK1, the comparator 10 samples the potential having a noise component in synchronism with the fall of the bias signal, and the latch circuit 11 latches the output signal having an error due to the presence of noise components in synchronism with the fall of the latch signal.

FIG. 5-(e') through (h') illustrate waveforms obtained according to the present invention. It will be noted that the waveform shown in FIG. 5-(g') is the same as that shown in FIG. 5-(g). As shown in FIG. 5-(e'), the bias signal shown in FIG. 5-(e) is delayed by $\tau_1$ by the first delay circuit 12. As shown in FIG. 5(f'), the latch signal shown in FIG. 5-(f) is delayed by $\tau_2$ by the second delay circuit 13. The delay time $\tau_1$ can be identical to or different from the delay time $\tau_2$. No noise component appears at the node (g) shown in FIG. 4 when the delayed bias signal shown in FIG. 5-(e') falls. Thus, the sampled signal is not affected by the noise components superimposed on the power supply voltages. Similarly, no noise component appears when the delayed latch signal shown in FIG. 5-(f') falls. Thus, the latch circuit 11 can latch the output signal from the comparator 10 correctly.

Figure 6:
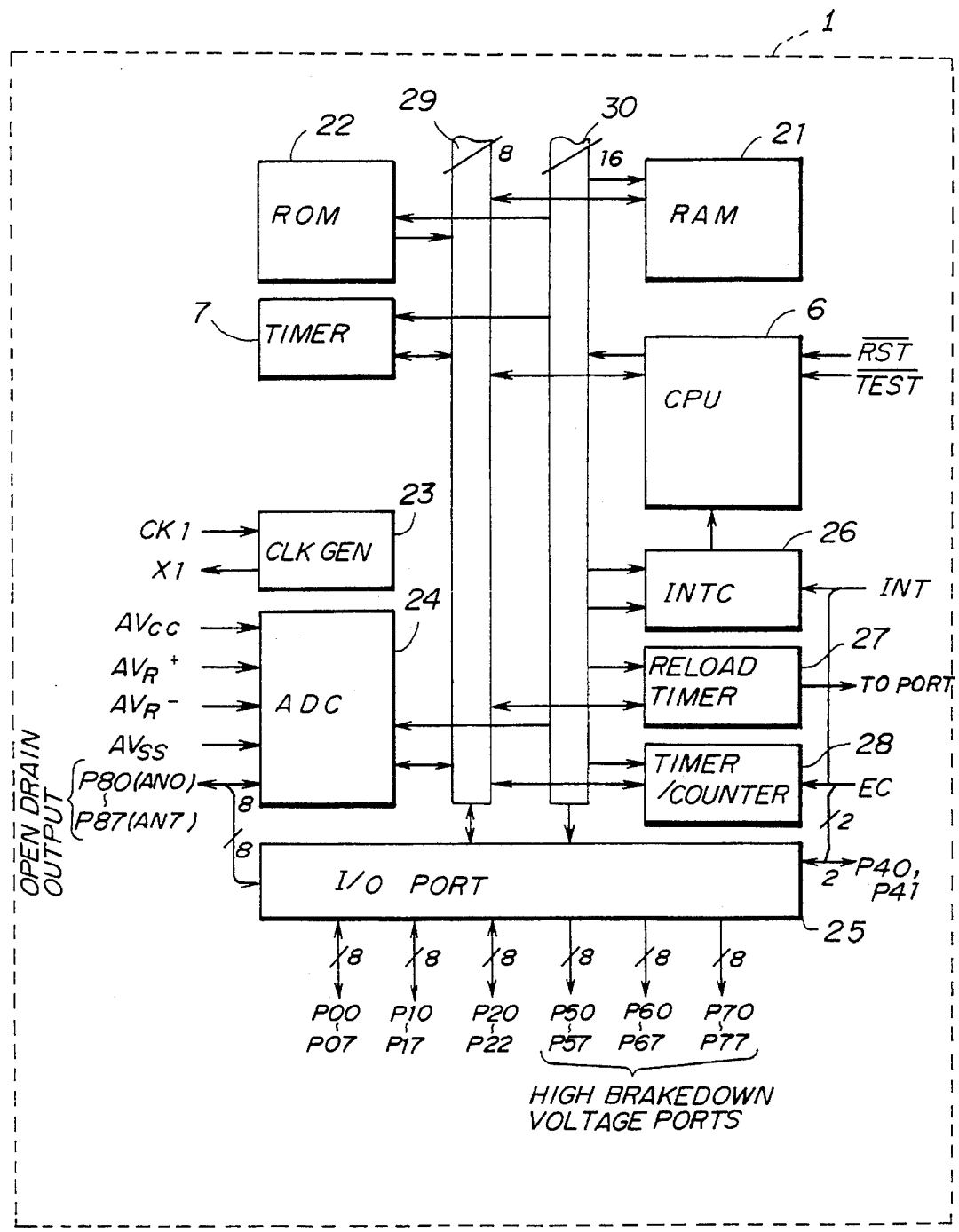
FIG. 6 is a block diagram illustrating a more detailed configuration of the one-chip microcomputer shown in FIG. 2.

FIG. 6 is a block diagram of the one-chip microcomputer 1 shown in FIG. 2. The digital signal processing circuit 2 comprises a RAM 21, a ROM 22, a clock generator (CK GEN) 23, an input/output (I/O) port 25, an interrupt controller (INTC) 26, a reload timer 27, a timer/counter 28, a data bus 29 and an address bus 30. An A/D converter (ADC) 24 corresponds to the analog signal processing circuit 3. The clock generator 23 receives the system clock signal CK1 from the system clock generator 4 (FIG. 2) and generates timing signals X1 which include the bias signal, the latch signal and other timing signals. That is, the timing generator 14 shown in FIG. 4 is included in the clock generator 23.

Figure 7:
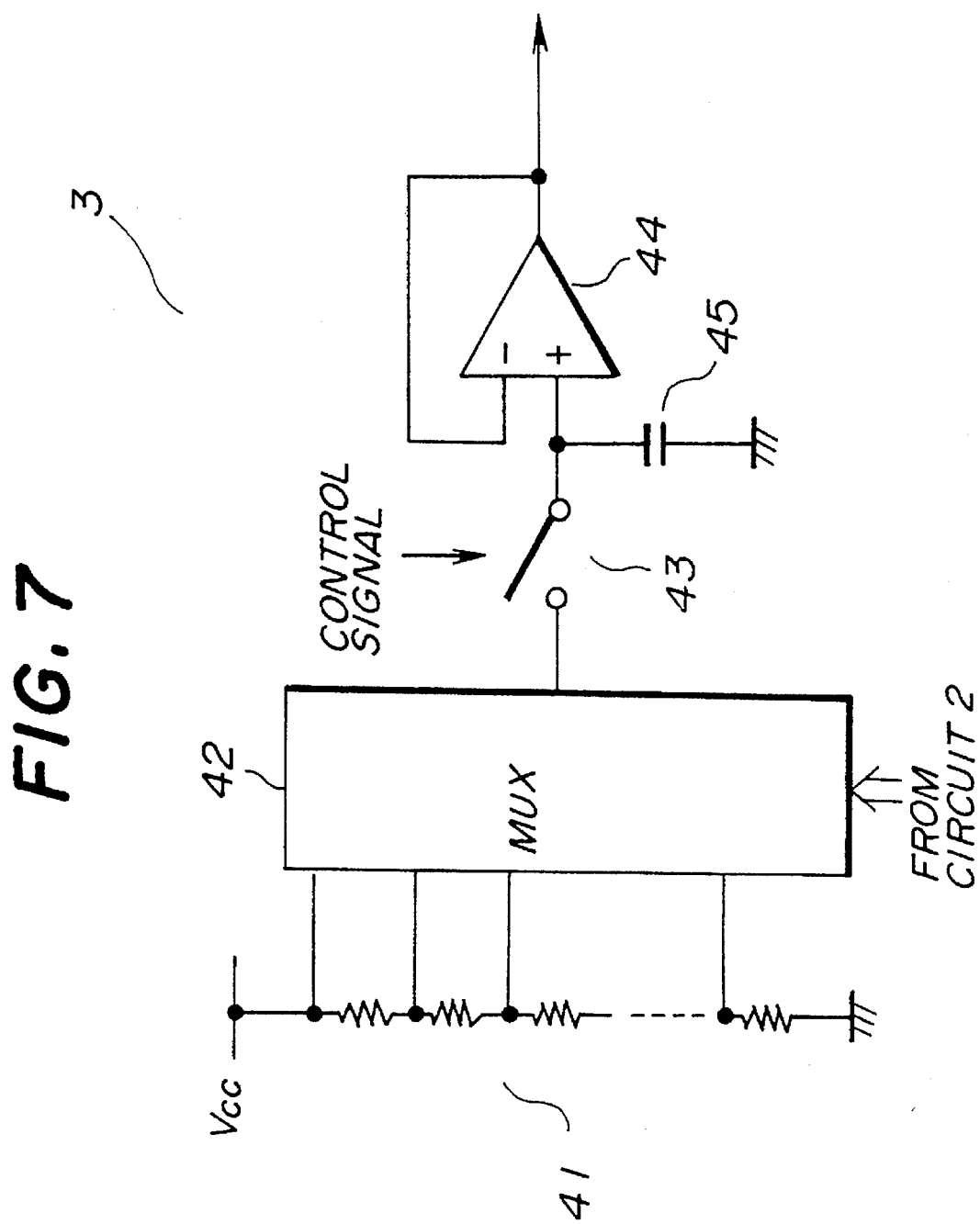
FIG. 7 is a circuit diagram of an analog-to-digital converter contained in the analog signal processing circuit shown in FIG. 2.

FIG. 7 is a digital-to-analog converter (hereinafter simply referred to as a D/A converter) contained in the analog signal processing circuit 3 shown in FIG. 2. The D/A converter has a resistor network 41, a multiplexer (MUX) 42 and a sample and hold circuit which is composed of a switch 43 and an operational amplifier 44. An instruction signal generated and output by the digital signal processing circuit 2 is applied to the multiplexer 42, which selects a tap out of the resistor network 41. The switch 43 is controlled by a control signal generated and output by the digital signal processing circuit 2. The control signal is derived from the system clock signal CK1 and the rise and fall timings of the control signal are different from the rise and fall timings of the system clock signal CK1. With this arrangement, the D/A converter can precisely sample the analog signal without being affected by noise components.

Although the one-chip microcomputer 1 includes the system clock generator 4, it is also possible to supply the one-chip microcomputer 1 with the system clock signal generated and output by an external circuit. In this case, there is no need for mounting the system clock generator 4 on the same chip.

The present invention is not limited to the specifically described embodiments, and variations and modifications may be made without departing from the scope of the present invention.

What is claimed is:

1. A one-chip semiconductor integrated circuit device comprising:

digital signal processing means for processing a digital signal in synchronism with a first clock signal; and analog signal processing means for sampling an analog input signal in synchronism with a second clock signal having a phase different from that of said first clock signal, said analog signal processing means comprising an analog-to-digital converter having a sample and hold circuit, and a latch circuit, said sample and hold circuit operating in synchronism with said second clock signal, and said latch circuit latching an output signal of said sample and hold circuit in synchronism with a third clock signal having a phase different from the phases of the first and second clock signals.

2. A one-chip semiconductor integrated circuit device as claimed in claim 1, further comprising delay means for delaying said first clock signal by a predetermined delay time and for outputting said second clock signal which rises and falls at timings different from timings at which said first clock signal rises and falls.

3. A one-chip semiconductor integrated circuit device as claimed in claim 1, further comprising clock generating means for generating said first clock signal.

4. A one-chip semiconductor integrated circuit device as claimed in claim 2, wherein:
said one-chip semiconductor integrated circuit device has a power supply line coupled to at least said digital signal processing means and said analog input signal processing means;
a power supply voltage of said power supply line has a noise component which is temporarily generated when said first clock signal rises and falls; and
said predetermined delay time is selected so that said second clock signal has a duration time during which said second clock signal is less affected by said noise component.

5. A one-chip semiconductor integrated circuit device as claimed in claim 2, wherein:
said one-chip semiconductor integrated circuit device has a power supply line coupled to at least said digital signal processing means and said analog input signal processing means;
a power supply voltage of said power supply line has a noise component which is temporarily generated when said first clock signal rises and falls; and
said predetermined delay time is selected so that said second clock signal rises and falls after said noise component becomes substantially zero.

6. A one-chip semiconductor integrated circuit device as claimed in claim 1, wherein:
said analog signal processing means comprises converting means for converting said analog input signal to a corresponding digital signal and a digital-to-analog converter having a sample and hold circuit; and
said sample and hold circuit samples and holds said corresponding digital signal in synchronism with said second clock signal and outputs an output signal.

7. A one-chip semiconductor integrated circuit device as claimed in claim 2, wherein said delay means comprises a plurality of inverters connected in series, and capacitors which are connected between said inverters and ground.

8. A one-chip semiconductor integrated circuit device as claimed in claim 1, wherein said one-chip semiconductor integrated circuit device is a one-chip microcomputer.

9. A one-chip semiconductor integrated circuit device as claimed in claim 1, wherein said second and third clock signals have respective timings so as to rise or fall when no noise component is superimposed on a power supply voltage of said power supply line.

10. A one-chip semiconductor integrated circuit device as claimed in claim 1, further comprising:
first delay means for delaying said first clock signal by a first predetermined delay time and for deriving said second clock signal from a delayed first clock signal; and
second delay means for delaying a latch signal by a second predetermined delay time and for deriving said third clock signal from a delayed latch signal.

11. A one-chip semiconductor integrated circuit device as claimed in claim 10, wherein said first and second predetermined delay times are enough long to make it possible for said second and third clock signals to rise or fall when no noise component is superimposed on a power supply voltage of said power supply line.

12. A one-chip semiconductor integrated circuit device comprising:
digital signal processing means for processing a digital signal in synchronism with a first clock signal;
timing generating means for generating a second clock signal from said first clock signal, said second clock signal having a cycle different from that of said first clock signal and rising and falling when said first clock signal rises and falls;
delay means coupled to said timing generating means, for delaying said second clock signal by a predetermined delay time and for outputting a third clock signal which rises and falls at timings different from timings at which said first clock signal rises and falls; and
analog signal processing means, directly coupled to said delay means, for sampling an analog input signal in synchronism with said third clock signal,
said analog signal processing means comprising an analog-to-digital converter having a sample and hold circuit, and a latch circuit,
said sample and hold circuit operating in synchronism with said third clock signal, and
said latch circuit latching an output signal of said sample and hold circuit in synchronism with a fourth clock signal having a phase different from the phases of the first and third clock signals.

13. A one-chip semiconductor integrated circuit chip as claimed in claim 12, further comprising clock generating means for generating said first clock signal.

14. A one-chip semiconductor integrated circuit device as claimed in claim 12, wherein:
said one-chip semiconductor integrated circuit device has a power supply line coupled to at least said digital signal processing means and said analog signal processing means;
a power supply voltage of said power supply line has a noise component which is temporarily generated when said first clock signal rises and falls; and
said predetermined delay time is selected so that said third clock signal has a duration time during which said third clock signal is less affected by said noise component.

15. A one-chip semiconductor integrated circuit device as claimed in claim 12, wherein:
said one-chip semiconductor integrated circuit device has a power supply line coupled to at least said digital signal processing means and said analog signal processing means;
a power supply voltage of said power supply line has a noise component which is temporarily generated when said first clock signal rises and falls; and
said predetermined delay time is selected so that said third clock signal rises and falls after said noise component becomes substantially zero.

16. A one-chip semiconductor integrated circuit device as claimed in claim 12, wherein:
said analog signal processing means comprises converting means for converting said analog input signal to a corresponding digital signal and a digital-to-analog converter having a sample and hold circuit; and said sample and hold circuit samples and holds said corresponding digital signal in synchronism with said third clock signal and outputs an output signal.

17. A one-chip semiconductor integrated circuit device as claimed in claim 12, wherein said delay means comprises inverters connected in series, and capacitors which are connected between said inverters and ground.

18. A one-chip semiconductor integrated circuit device as claimed in claim 12, wherein said one-chip semiconductor integrated circuit device is a one-chip microcomputer.

19. A one-chip semiconductor integrated circuit device as claimed in claim 12, wherein said third and fourth clock signals have respective timings so as to rise or fall when no noise component is superimposed on a power supply voltage of said power supply line.

20. A one-chip semiconductor integrated circuit device as claimed in claim 12, further comprising:

first delay means for delaying said second clock signal by a first predetermined delay time and for deriving said third clock signal from a delayed second clock signal; and second delay means for delaying a latch signal by a second predetermined delay time and for deriving said fourth clock signal from a delayed latch signal.

21. A one-chip semiconductor integrated circuit device as claimed in claim 20, wherein said first and second predetermined delay times are enough long to make it possible for said third and fourth clock signals to rise or fall when no noise component is superimposed on a power supply voltage of said power supply line.

22. A one-chip semiconductor integrated circuit device comprising:

digital signal processing means for processing a digital signal in synchronism with a first clock signal;

timing generating means for generating a second clock signal and a third clock signal from said first clock signal, each of said second and third clock signals having a cycle different from that of said first clock signal and rising and falling when said first clock signal rises and falls;

delay means, coupled to said timing generating means, for delaying said second and third clock signals by respective predetermined delay times and for outputting fourth and fifth clock signals which rise and fall at timings different from timings at which said first clock signal rises and falls; and analog signal processing means, directly coupled to said delay means, for performing a predetermined analog operation on an analog input signal in synchronism with said fourth and fifth clock signals, wherein:

said analog signal processing means comprises an analog-to-digital converter having a sample and hold circuit and a latch circuit;

said sample and hold circuit samples and holds said analog input signal in synchronism with said fourth clock signal and output an output signal; and said latch circuit latches said output signal in synchronism with said fifth clock signal.

23. A one-chip semiconductor integrated circuit device as claimed in claim 22, further comprising clock generating means for generating said first clock signal.

24. A one-chip semiconductor integrated circuit device as claimed in claim 22, wherein:

said one-chip semiconductor integrated circuit device has a power supply line coupled to at least said digital signal processing means and said analog input signal processing means;

a power supply voltage of said power supply line has a noise component which is temporarily generated when said first clock signal rises and falls; and each of said respective predetermined delay times is selected so that each of said fourth and fifth clock signals has a duration time during which said fourth and fifth clock signals are less affected by said noise component.

25. A one-chip semiconductor integrated circuit device as claimed in claim 22, wherein:

said one-chip semiconductor integrated circuit device has a power supply line coupled to at least said digital signal processing means and said analog signal processing means;

a power supply voltage of said power supply line has a noise component which is temporarily generated when said first clock signal rises and falls; and each of said respective predetermined delay times is selected so that each of said fourth and fifth clock signals rises and falls after said noise component becomes substantially zero.

26. A one-chip semiconductor integrated circuit device as claimed in claim 25, wherein each of said first and second delay means comprises inverters connected in series, and capacitors coupled between said inverters and ground.

27. A one-chip semiconductor integrated circuit device as claimed in claim 22, wherein:

said delay means comprises first delay means for delaying said second clock signal by a first predetermined delay time and for outputting said fourth clock signal, and second delay means for delaying said third clock signal by a second predetermined delay time and for outputting said fifth clock signal.

28. A one-chip semiconductor integrated circuit device as claimed in claim 27, wherein said first predetermined delay time is substantially identical to said second predetermined delay time.

29. A one-chip semiconductor integrated circuit deice as claimed in claim 27, wherein said first predetermined delay time is different from said second predetermined delay time.

30. A one-chip semiconductor integrated circuit device as claimed in claim 22, wherein said one-chip semiconductor integrated circuit device is a one-chip microcomputer.

* * * * *